United States Patent [19]
Koike et al.

[11] Patent Number: 5,655,368
[45] Date of Patent: Aug. 12, 1997

[54] VISCOUS DAMPER FOR HYDRAULIC POWER TRANSMISSION

[75] Inventors: Yasuto Koike; Tatsuro Miyoshi; Masao Shoji, all of Shizuoka-ken, Japan

[73] Assignee: NSK-Warner K.K., Tokyo, Japan

[21] Appl. No.: 364,934

[22] Filed: Dec. 28, 1994

[30] Foreign Application Priority Data

Dec. 28, 1993 [JP] Japan ............................ 5-349752

[51] Int. Cl.⁶ ........................................ F16D 33/00
[52] U.S. Cl. ...................... 60/338; 60/365; 192/3.29; 192/208
[58] Field of Search ................... 60/330, 338, 365; 192/3.29, 208

[56] References Cited

U.S. PATENT DOCUMENTS

| | | | |
|---|---|---|---|
| 2,890,661 | 6/1959 | Egbert | 60/365 |
| 2,910,832 | 11/1959 | Kelley | 60/362 |
| 4,466,518 | 8/1984 | Mueller | 192/3.29 |
| 4,557,357 | 12/1985 | Tinholt | 60/338 |

FOREIGN PATENT DOCUMENTS

| | | | |
|---|---|---|---|
| 634574 | 1/1962 | Canada | 60/338 |
| 480267 | 4/1992 | European Pat. Off. | 192/3.29 |

*Primary Examiner*—F. Daniel Lopez
*Attorney, Agent, or Firm*—Evenson, McKeown, Edwards & Lenahan, P.L.L.C.

[57] ABSTRACT

Described is a viscous damper for a hydraulic power transmission with a lockup clutch. The viscous damper is composed of at least one blade mounted on at least one element of the hydraulic power transmission so that said at least one blade is located in an oil filled in said hydraulic power transmission and controls occurrence of self-excited vibrations. Preferably, plural blades are mounted on a wall of at least one of mutually opposing two elements of the hydraulic transmission, said wall of said at least one element being locate opposite a wall of the other element.

7 Claims, 6 Drawing Sheets

VISCOUS DAMPER FOR HYDRAULIC POWER TRANSMISSION

BACKGROUND OF THE INVENTION a) Field of the Invention

This invention relates to a viscous damper for a hydraulic power transmission such as a torque converter which is used in an automatic transmission for a vehicle and is equipped with a lockup clutch. The term "viscous damper" means a vibration damping device making use of viscous resistance.

b) Description of the Related Art

A torque converter which is recently used in a power transmission or the like arranged in association with an engine of an automotive vehicle is a kind of hydraulic power transmission using a pump and a turbine. Even when the turbine and the pump become substantially equal in revolution speed, there is still a relative sliding motion between the pump and the turbine so that the torque converter has lower mechanical efficiency of power transmission compared with a straight-line transmission mechanism making use of a mechanical clutch.

In a space formed between an input casing fixed on an input shaft of the torque converter, to which input shaft power is transmitted from the engine, and outer peripheral faces of turbine runners, a lockup clutch capable of directly connecting the input shaft and the output shaft with each other is therefore often arranged.

With reference to FIG. 1 of the accompanying drawings, one example of the construction of a torque converter 10 with a lockup clutch will be described first. Illustrated in FIG. 1 are an input casing 1 fixed on an input shaft (not shown) extending from an unillustrated engine, a pump 2 fixed on the input casing 1, a turbine 3 located opposite the pump 2, a stator 4, a first driven plate 5 connected with the turbine 3 and a power transmitting portion 7 by a connector 11, a second driven plate 6 fixedly secured to the first driven plate 5 by a rivet 9, an output shaft 8 connected to the power-transmitting portion 7 via a spline engagement or the like, a drive plate 21, a clutch piston 23 of the lockup clutch, said clutch piston 23 being slidably disposed in a space between the input casing 1 and the turbine 3, and a friction lining 24 arranged on the clutch piston 23. The drive plate 21 is coupled at an engaged portion 22 thereof with the clutch piston 23. Further, power can be transmitted between the drive plate 21 and the first and second plates 5,6 while permitting a slight relative motion therebetween via a spring 25.

When the torque converter 10 is operated without using the lockup clutch, power from the engine enters the input casing 1 and hence rotates the pump 2 so that the turbine 3 located opposite the pump 2 is rotated. As described above, the turbine 3 is fixed on the power transmitting portion 7 by the connector 11 and the power transmitting portion 7 is connected to the output shaft 8. Rotation of the turbine 3 is therefore transmitted to the output shaft 8.

When the lockup clutch is in operation, the clutch piston 23 is pushed leftward by a hydraulic pressure as viewed in the drawing so that the clutch piston 23 is rotated integrally with the input casing 1 with the friction lining 24 interposed therebetween. An input from the engine is therefore transmitted directly to the clutch piston 23 via the input casing 1.

As the drive plate 21 is coupled at the engaged portion 22 thereof with the clutch piston 23, the drive plate 21 rotates integrally with the clutch piston 23 and the rotation of the drive plate 21 is transmitted to the first and second driven plates 5,6 via the spring 25. Because the first driven plate 5 is fixed on the power transmitting portion 7 by the connector 11, the power from the engine is accordingly transmitted to the output shaft 8 via the lockup clutch.

Power is transmitted between the drive plate and the driven plates via the spring in the conventional torque converter with the lockup clutch. Owing to damping action of the spring, it is therefore possible to absorb and reduce a torsional vibration or an impact even if such a torsional vibration or impact is produced on the input shaft.

The conventional torque converter with the lockup clutch can therefore damp or reduce a single torsional vibration or impact of the shaft produced by a large fluctuation in torque, but is accompanied by the drawback that it can hardly control self-excited minute vibrations which are continuously produced in the course of engagement of the lockup clutch.

SUMMARY OF THE INVENTION

An object of the present invention is therefore to eliminate the above drawback and to provide a device useful in damping such self-excited minute vibrations.

In one aspect of the present invention, there is hence provided a viscous damper for a hydraulic power transmission with a lockup clutch, comprising at least one blade mounted on at least one element of the hydraulic power transmission so that said at least one blade is located in an oil filled in the hydraulic power transmission and controls occurrence of self-excited vibrations. Said at least one blade preferably extends in an axial direction of the hydraulic power transmission so that, while power is being transmitted through the hydraulic power transmission, said at least one blade efficiently increases the viscous resistance of the oil. Said at least one element is selected, for example, from an input casing, a turbine, a pump, a clutch piston or a driven plate of the hydraulic power transmission.

Elements, that is, parts of the hydraulic power transmission such as a torque converter are all located in an oil so that, when blades are mounted on their side walls, these blades are also located in the oil obviously. As the viscous resistance of each blade in the oil increases in proportion to the square of the revolution speed, the presence of these blades can control occurrence of self-excited vibrations.

Further, arrangement of blades in an opposing relationship between an input side and an output side is more effective in reducing a relative motion which takes place due to self-excited vibrations between the input side and the output side.

Owing to the viscous damping effects of the blade, the viscous damper according to the present invention can prevent occurrence of excited vibrations during operation of the lockup clutch.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 1:
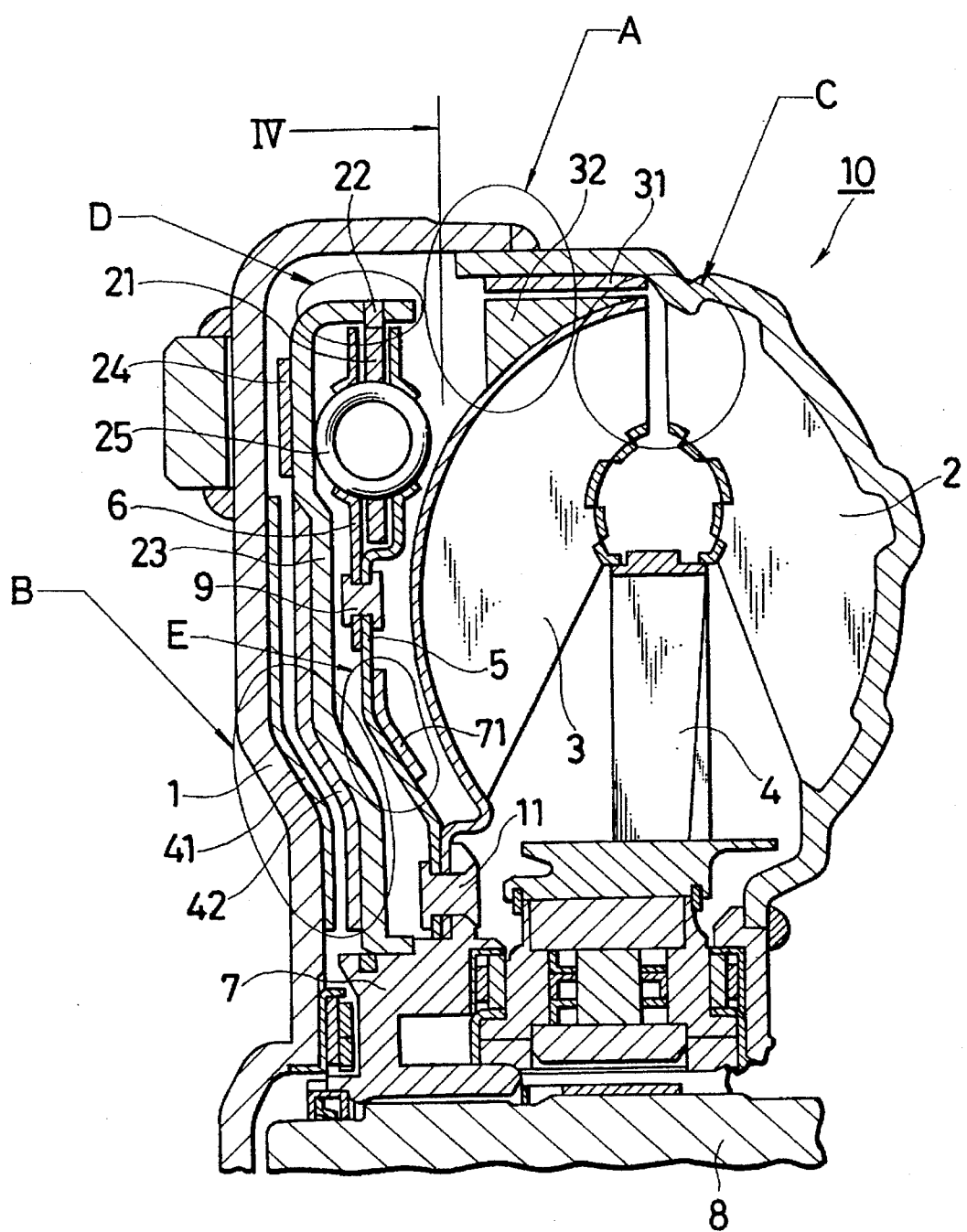
FIG. 1 is a cross-sectional view of a hydraulic power transmission equipped with a viscous damper according to one embodiment of the present invention.

One embodiment of the present invention will now be described with reference to FIG. 1. Blades 31 are arranged on an inner wall of the pump 2, blades 32 on an outer peripheral wall of the turbine 3, blades 41 on an inner wall of the input casing 1, and blades 42 on a wall of the clutch piston 23, said wall being located opposite the blades 41.

Figure 2:
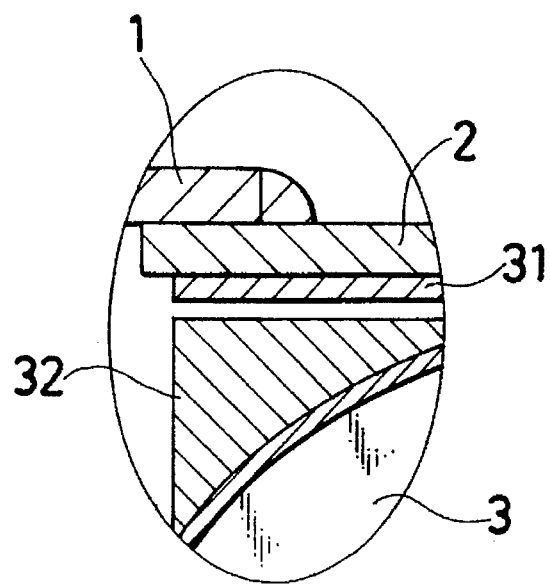
FIG. 2 is an enlarged view of a portion indicated by A in FIG. 1.
Figure 3:
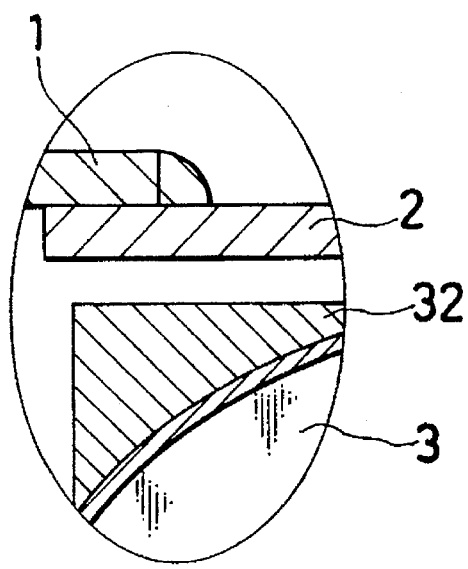
FIG. 3 is similar to FIG. 2 but illustrates a modification of the embodiment of FIG. 1.

FIG. 2 depicts one of the blades 31 arranged on the pump 2 and one of the blades 32 disposed on the turbine 3. In the modification shown in FIG. 3, the blades 31 have been omitted.

Figure 4:
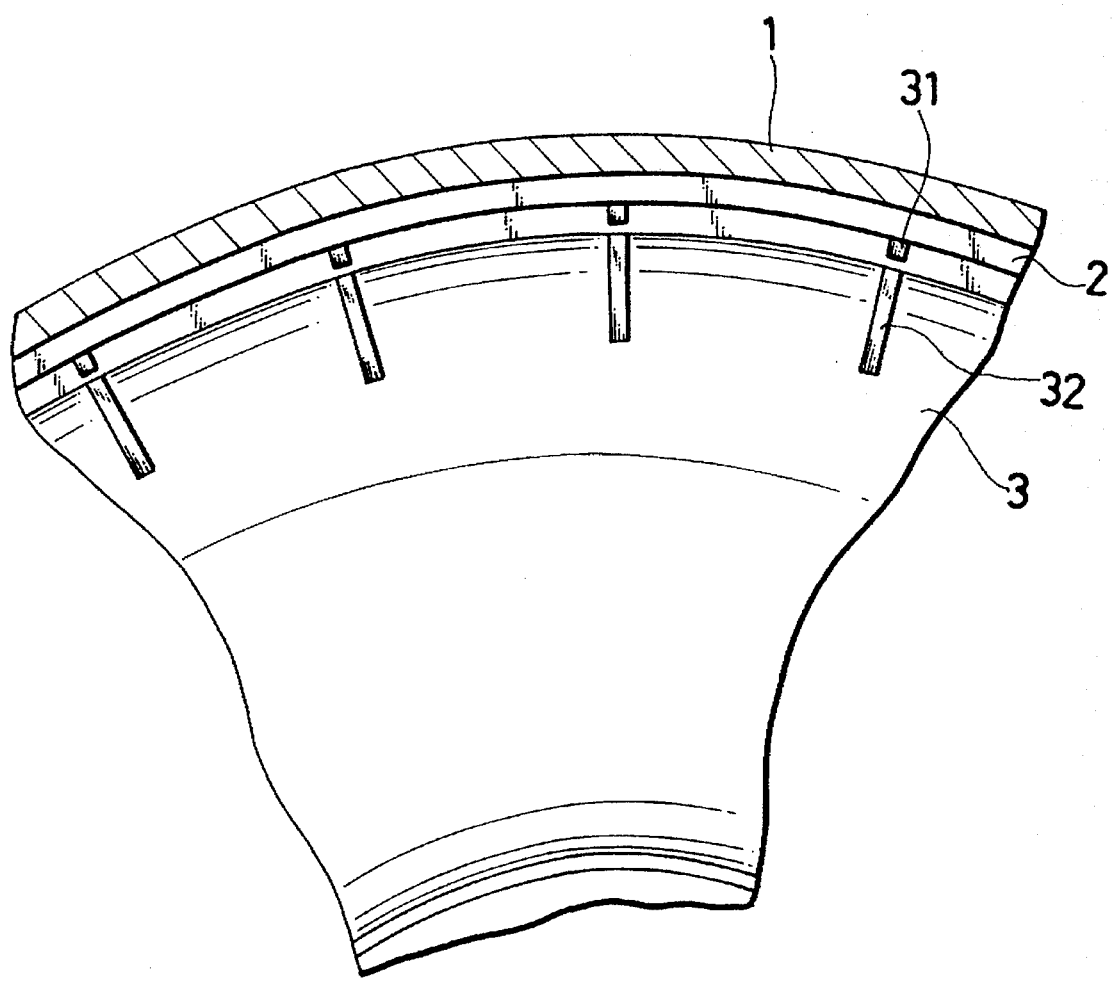
FIG. 4 is a view taken in the direction of arrows IV—IV of FIG. 1.

FIG. 4 shows one of the blades 31 and one of the blades 2 mounted on the pump 2 and the turbine 3, respectively.

Figure 5:
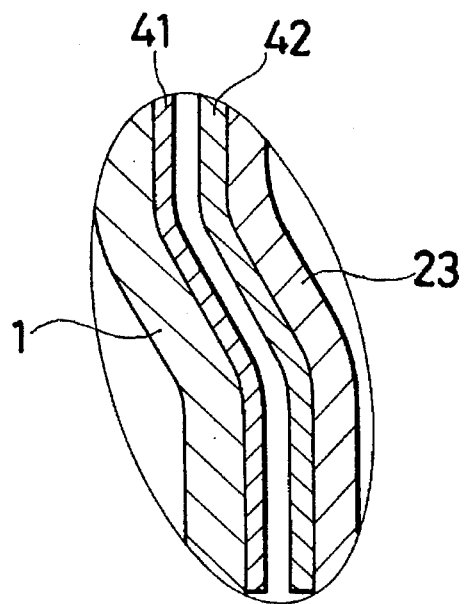
FIG. 5 is an enlarged view of a portion indicated by B in FIG. 1.

FIG. 5 illustrates one of the blades 41 and one of the blades 42 arranged on the input casing 1 and the clutch piston 23, respectively.

Figure 6:
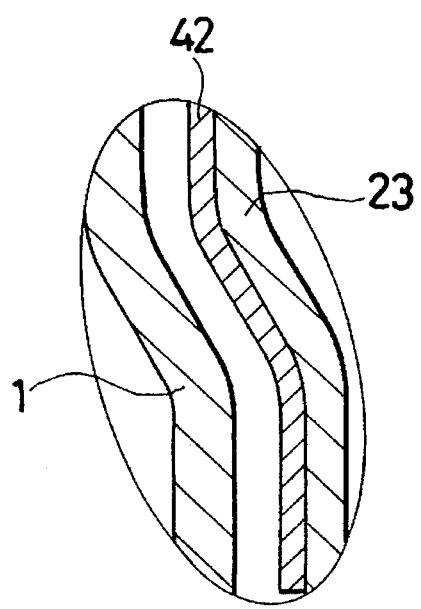
FIG. 6 is similar to FIG. 5 but illustrates another modification of the embodiment of FIG. 1.

In the modification illustrated in FIG. 6, the blades 41 have been omitted and only the blades 42 are arranged.

Figure 7:
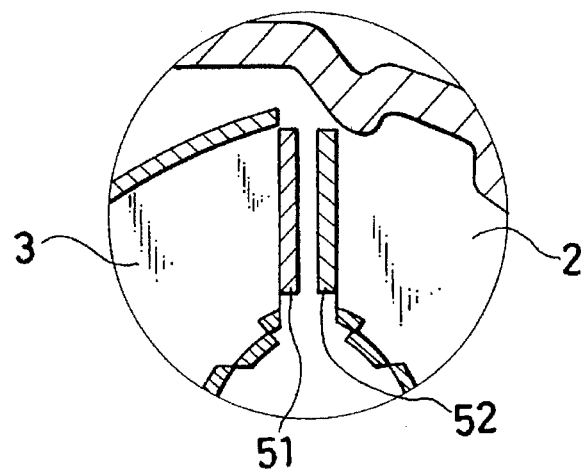
FIG. 7 is an enlarged view of a portion indicated by C in FIG. 1.

FIG. 7 shows blades 51 arranged on a free end face of the pump 2 and blades 52 disposed on a free end face of the turbine 3 so that the blades 51 and the blades 52 are located opposite each other.

Figure 8:
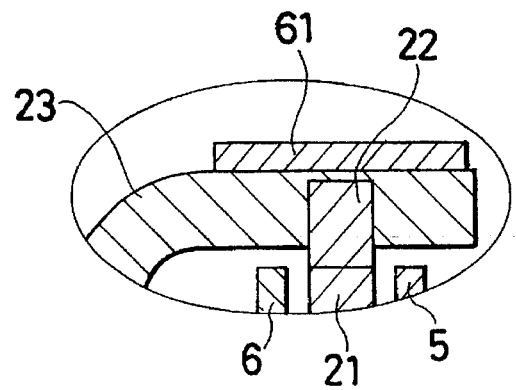
FIG. 8 is an enlarged view of a portion indicated by D in FIG. 1.

FIG. 8 illustrates blades 61 arranged on an outer peripheral wall of the clutch piston 23.

Figure 9:
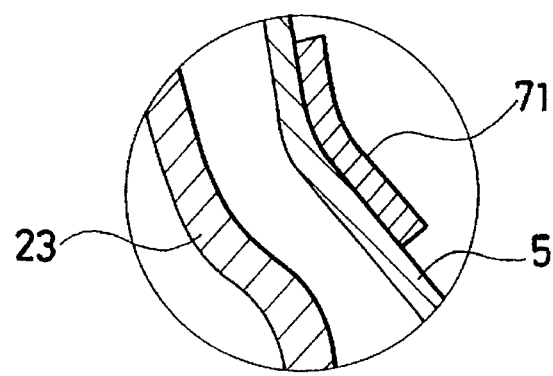
FIG. 9 is an enlarged view of a portion indicated by E in FIG. 1.

FIG. 9 depicts blades 71 arranged on a side wall of the first driven plate 5, said side wall being located on a side of the turbine 3.

As is appreciated from the foregoing, the viscous damper according to the present invention is composed of the blades arranged on the side walls of the individual parts of the hydraulic power transmission with the lockup clutch. The blades arranged on the side wall of one of the parts extend in an axial or like direction toward those disposed on the side wall of the opposing part with a suitable interval left therebetween so that they do not interfere with each other. At some other appropriate positions, some of the blades are arranged extending in an axial or like direction. As these blades are located in the oil, their rotation in the oil can damp vibrations owing to viscous resistance of the oil. It is therefore possible to control self-excited minute vibrations or the like, which occur continuously in the course of engagement of the lockup clutch, without the need for an improvement in the damping mechanism.

Figure 10:
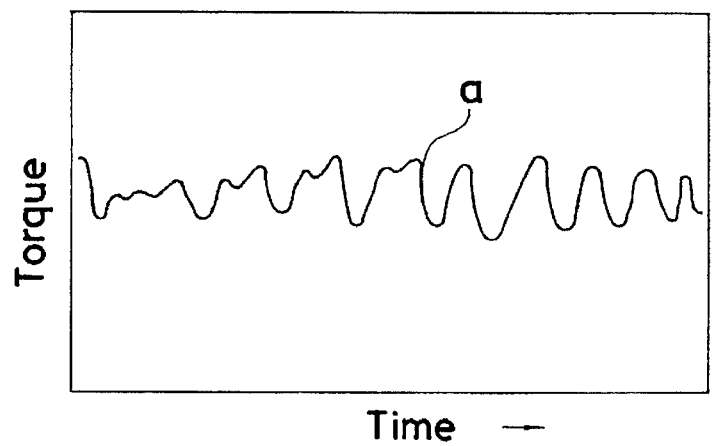
FIG. 10 is a diagram showing fluctuations in torque when no damping device is arranged.

FIG. 10 illustrates fluctuations in torque due to vibrations from the start of operation of the lockup clutch until its end, in other words, from the beginning of engagement or disengagement until its end. The time t of movement of the clutch piston 23 in FIG. 1 is plotted along the abscissa, while the torque T transmitted from the engine without any damping device and including vibrations is plotted along the ordinate. Curve a indicates the fluctuating torque.

Figure 11:
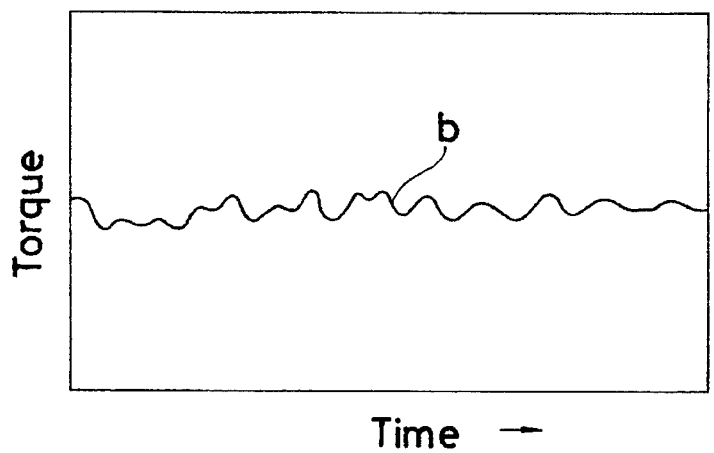
FIG. 11 is a diagram illustrating fluctuations in torque when a spring is arranged.

FIG. 11 shows that fluctuations in torque have been reduced owing to the provision of a known damping device like the spring 25 in FIG. 1. Curve b indicates the torque fluctuations so reduced. The fluctuations are much smaller than the fluctuations shown in FIG. 10, but torque fluctuations due to self-excited minute vibrations continuously occurred during operation of the lockup clutch are still uncontrolled.

Figure 12:
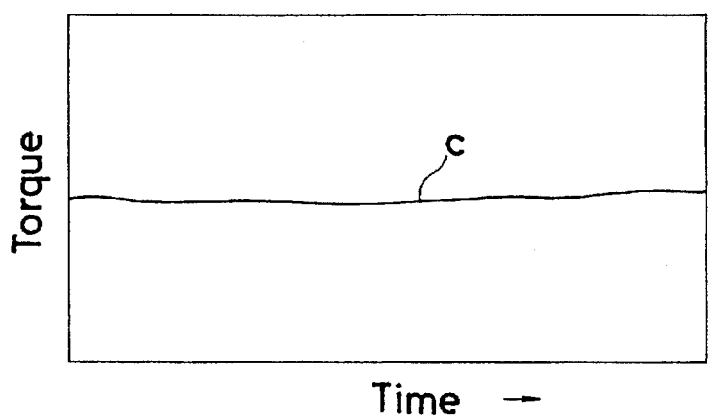
FIG. 12 is a diagram depicting fluctuations in torque when the viscous damper according to the one embodiment of the present invention is arranged.

FIG. 12 illustrates that, owing to the viscous damping action according to the present invention, torque fluctuations due to vibrations have been almost completely controlled. Curve c indicates that there are substantially no fluctuations in torque.

What is claimed is:

1. A viscous damper for a hydraulic power transmission with a lockup clutch, comprising at least one blade mounted on at least one element of said hydraulic power transmission so that said at least one blade is located in an oil filled in said hydraulic power transmission and controls occurrence of self-excited vibrations, wherein said at least one element is selected from an input casing, a turbine, a pump, a clutch piston or a driven plate of said hydraulic power transmission, and wherein blades are mounted in an opposing relationship on the input casing and an outer peripheral wall of the turbine.

2. A viscous damper according to claim 1, wherein said at least one blade extends in an axial direction of said hydraulic power transmission so that, while power is being transmitted through said hydraulic power transmission, said at least one blade efficiently increases the viscous resistance of the oil.

3. A viscous damper according to claim 1, wherein a plurality of blades are mounted on said at least one element.

4. A viscous damper according to claim 1, wherein blades are mounted in an opposing relationship on the clutch piston and the input casing.

5. A viscous damper according to claim 1, wherein blades are mounted in an opposing relationship on the turbine and the pump.

6. A viscous damper according to claim 1, wherein at least one blade is mounted on a wall of at least one of mutually opposing two elements of said hydraulic transmission, said wall of said at least one element being located opposite a wall of the other element.

7. A viscous damper according to claim 1, wherein said hydraulic power transmission comprises an output shaft, and wherein said at least one vibration-damping blade is mounted such that it extends in both axial and radial directions with respect to said output shaft.

\* \* \* \* \*